United States Patent
Huber et al.

(10) Patent No.: US 7,230,947 B1
(45) Date of Patent: Jun. 12, 2007

(54) MINIMUM LATENCY CUT-THROUGH SWITCH FABRIC

(75) Inventors: John David Huber, San Diego, CA (US); Kirk Alvin Miller, San Diego, CA (US); Michael John Hellmer, Carlsbad, CA (US); Kenneth Yi Yun, San Diego, CA (US); Kevin Warren James, San Diego, CA (US); George Beshara Bendak, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 982 days.

(21) Appl. No.: 10/378,502

(22) Filed: Mar. 3, 2003

Related U.S. Application Data

(63) Continuation-in-part of application No. 10/023,266, filed on Dec. 14, 2001, now abandoned, which is a continuation-in-part of application No. 10/022,673, filed on Dec. 17, 2001, now Pat. No. 7,079,545, which is a continuation-in-part of application No. 10/029,581, filed on Dec. 20, 2001, and a continuation-in-part of application No. 10/035,835, filed on Dec. 24, 2001, now Pat. No. 7,020,131, and a continuation-in-part of application No. 10/373,139, filed on Feb. 24, 2003.

(51) Int. Cl.
    *H04Q 11/00* (2006.01)
(52) U.S. Cl. ....................... 370/386; 370/390
(58) Field of Classification Search ............... 370/386, 370/229, 235, 390, 397
    See application file for complete search history.

(56) References Cited

U.S. PATENT DOCUMENTS

| | | | |
|---|---|---|---|
| 6,515,991 B1* | 2/2003 | McKeown | 370/390 |
| 6,721,273 B1* | 4/2004 | Lyon | 370/235 |
| 7,042,842 B2* | 5/2006 | Paul et al. | 370/229 |
| 2003/0026267 A1* | 2/2003 | Oberman et al. | 370/397 |

* cited by examiner

*Primary Examiner*—Hanh Nguyen
*Assistant Examiner*—Albert T. Chou
(74) *Attorney, Agent, or Firm*—Law Office of Gerald Maliszewski; Gerald Maliszewski

(57) ABSTRACT

A system and method are provided for cut-through packet routing in a packet communications switch fabric. The method comprises: accepting information packets addressed to a plurality of output port card egress ports at an input port card ingress port; routing information packets between port cards on backplane data links through an intervening crossbar; maintaining a credit counter for each port card egress destination, at the input port card; decrementing the counter in response to transmitting cells in a packet from the input port card; and, incrementing the counter in response to transmitting cells from the packet at the output port card. In some aspects of the method, accepting information includes buffering the packets in an ingress memory subsystem (iMS). Routing information includes the iMS transmitting buffered packets on a selected backplane data link. Decrementing the counter includes the iMS communicating with the iPQ in response to transmitting a cell.

23 Claims, 7 Drawing Sheets

MINIMUM LATENCY CUT-THROUGH SWITCH FABRIC

RELATED APPLICATIONS

This application is a continuation-in-part of a application entitled, SYSTEM AND METHOD FOR SWITCHING VARIABLY SIZED INFORMATION GROUPS, invented by Yun et al., Ser. No. 10/023,266, filed Dec. 14, 2001 now abandoned.

This application is a continuation-in-part of a application entitled, SYSTEM AND METHOD FOR SIMULTANEOUS DEFICIT ROUND ROBIN PRIORITIZATION, invented by Yun et al., Ser. No. 10/022,673, filed Dec. 17, 2001 now U.S. Pat. No. 7,079,545.

This application is a continuation-in-part of a pending application entitled, SYSTEM AND METHOD FOR GRANTING ARBITRATED BIDS IN THE SWITCHING OF INFORMATION, invented by Yun et al., Ser. No. 10/029,581, filed Dec. 20, 2001.

This application is a continuation-in-part of a application entitled, SYSTEM AND METHOD FOR HIERARCHICAL SWITCHING, invented by Yun et al., Ser. No. 10/035,835, filed Dec. 24, 2001 now U.S. Pat. No. 7,020,131.

This application is a continuation-in-part of a pending application entitled, SYSTEM AND METHOD FOR TOLERATING DATA LINK FAULTS IN A PACKET COMMUNICATIONS SWITCH FABRIC, invented by Clovis et al., Ser. No. 10/373,139, filed Feb. 24, 2003, which is incorporated herein by reference.

BACKGROUND OF THE INVENTION

1. Field of the Invention

This invention generally relates to packet communications switching and, more particularly, to a cut-through packet routing system and method that has been optimized to reduce latency through the switch fabric.

2. Description of the Related Art

There is industry demand for integrated circuits (ICs) switching systems that can be easily scaled for Network Access, the Network Edge, or a Core Switch Router, at the high end. SCSA (Signal Computing System Architecture) defines a switch fabric to be the facility for connecting any two (or more) transmitting or receiving Service Providers.

FIG. 6 is a schematic block diagram of a general switch fabric system (prior art). Traffic enters the system on the ingress side (the left side of the figure). Traffic exits the system on the egress side (the right side of the figure). The port card ingress and egress structures are sometimes subdivided into channels and subchannels. The packet headers specify a required destination port card, channel, and subchannel. The system must synchronously route each ingress packet to the correct egress destination.

Packets are converted into frames by ingress traffic managers (iTMs). A frame is a logical unit of data, which is often a small piece of a much larger data set such as a file or image. The iTMs feed the ingress side of the fabric. The switch fabric might convert the frame format to a "native" format, and then on egress, convert the data back into the TM frame format before sending the data to the egress traffic managers (eTMs). If the frames are fixed size (for example: 53 bytes, 64 bytes, or 80 bytes), the frames are often called cells.

Protocol Specific vs. Protocol Agnostic

A switch fabric can be protocol specific or protocol agnostic. An example of a protocol specific switch fabric would be a system designed and optimized specifically for asynchronous transfer mode (ATM) traffic. Another example would be a switch that handles only TCP/IP traffic. The obvious disadvantage of a switch fabric hardwired to handle a specific protocol is lack of flexibility. Service providers want to sell services to a variety of customers in various industries. Protocols vary from industry to industry.

Even within one protocol type, there can be protocol upgrades. For example, TCP/IP, the machine language of Internet routers, now runs primarily "IPv4." This protocol, successful as it has been, has a lack of available addresses, poor security features, and no "quality of service" (QoS) provisions. The next generation Internet protocol is "IPv6." It provides solutions to these limitations.

A protocol agnostic switch fabric works equally well with all protocol types, however, the traffic manager must be responsible for recognizing specific protocol types. The disadvantage of a protocol agnostic switch fabric is that it may be more complicated, and perhaps slower than a switch fabric dedicated to a particular protocol.

Packet Striping vs. Single Link per Packet

The simplest way for a traffic manager to transmit a packet into a switch fabric is to transmit the packet serially along one line. Striping is a way of achieving higher bandwidth by transmitting a single packet across multiple ingress/egress lines. For example, a TM can transmit a packet into a switch fabric eight times as fast if the packet is sliced into eight pieces (stripes) by the TM, and conveyed into the fabric along 8 parallel lines simultaneously. The fabric captures the packet in memory, routes it to the required egress destination, and slices the packet into 8 parallel lines before transmitting the packet to the egress TM.

The upside to packet striping is the potential for lower latency. There are several negative aspects of packet striping:

if one of the links is damaged (1 of 8 in the example above), the entire channel is out of service, degrading fault tolerance; and, the interface between the TM and switch fabric is more complicated. Circuitry must be used to slice the packet into stripes and reassemble it into packets.

Single-Cell Packet vs. Multi-Cell Packets

Many switch fabrics now deployed and passing revenue traffic, especially in wide area networks (WANs), use asynchronous transfer mode (ATM) packets. ATM packets are single-cell packets, with a fixed cell size of 53 bytes, 48 bytes of which is the information payload. The ATM specification evolved in the 1980s and early 1990s. It was then believed that variable length (multi-cell) packets would be too difficult to implement at rates needed for wire-speed traffic. The single-cell solution was a compromise that would work for voice data, video data, multimedia data, email data, file data, etc. With a fixed frame size, switch designs are simplified and ultimately faster.

However, files are better sent in large frames. Voice switching performs better with small bursts of data, corresponding to analog-to-digital converter time slots. Large frames and concomitant switching latencies can render a switch useless for most 2-way voice applications. Voice communications require low latency (time delay). Since ATM had to work for all network data, the small payload (voice) requirements prevailed at the expense of the large frame applications.

For large frames or packets it is much more efficient to establish a path from an ingress port card to the required egress destination, and then leave this path undisturbed until the packet is completed. With single cell packets, the ingress port card must bid for, accept grants, and then schedule each cell of a multi-cell packet.

There are also Frame Relay switch fabrics. Frame Relay is a single-cell protocol, albeit with frame size ranging from 6 to 4096 bytes. Such switch fabrics have been deployed and passing revenue traffic since the early 1990s. These switch fabrics have generally not been used for voice data because of the large latency. Only highly compressed voice traffic works well over frame relay. Voice-over-frame relay was added as an afterthought by network engineers. Frame relay excels at data communications such as local area network internetworking (LAN-to-LAN). Such communications are very high speed and bursty, with non-critical latency constraints.

Cut-Through vs. Store-and-Forward

The conventional method of switch fabric packet routing is called Store-and-Forward. In this method, the switch fabric accepts an input packet and buffers the packet on the ingress side of the fabric, making sure the packet was received intact, knowing the exact number of cells in the packet. The problem with the store-and-forward method is the added latency of buffering the packet. In Cut-through Packet Routing (CPR), a switch fabric is able to send the incoming packet cells to the correct egress port as soon as the destination address is known.

Memory-Based vs. Arbitrated Crossbar

A switch fabric can use memory-based crossbars or arbitrated crossbars. A memory-based crossbar is sometimes called a "shared memory switch." Ingress packets flow from the port cards into a huge memory bank, which serve as the switch. From the memory bank, the destination address is determined from egress port destination information in the cell headers. The problem with these switch fabrics is that they become prohibitively expensive and large from all the required high-speed memory. Such fabrics cannot be used to reach terabit total switching speeds with technology available today.

It would be advantageous if a switch fabric could use arbitrated crossbars to reduce the need for high-speed memory.

It would be advantageous if a switch fabric could use cut-through packet routing to reduce latency.

It would be advantageous if a switch fabric could handle multi-cell packets, so as to switch larger-sized packets with a reduced latency.

It would be advantageous if a switch fabric could use a single-link for each packet, to improve the system fault tolerance and simplify the interface to a TM.

It would be advantageous if the above-mentioned switch fabric could operate protocol agnostic.

SUMMARY OF THE INVENTION

The present invention describes a cut-through system and method that permits a switch fabric to communicate packets with minimum latency. The invention is able to track a packet from ingress to egress using a credit counter. The backplane data links between input and output port cards remain locked until it has been determined that cells from the packet has been transmitted by the output port card.

Accordingly, a method is provided for cut-through packet routing in a packet communications switch fabric. The method comprises: accepting information packets including a plurality of cells and addressed to a plurality of output port card egress ports, at an input port card ingress port; routing information packets between port cards on backplane data links through an intervening crossbar; maintaining a credit counter for each port card egress destination, at the input port card; decrementing the counter in response to transmitting cells in a packet from the input port card; and, incrementing the counter in response to transmitting cells from the packet at the output port card.

In some aspects of the method, accepting information at an input port card ingress port includes buffering the packets in an ingress memory subsystem (iMS). Routing information packets between port cards on backplane data links through an intervening crossbar includes the iMS transmitting buffered packets on a selected backplane data link. Maintaining a counter for each port card egress port at the input port card includes maintaining the counters in an ingress priority queue (iPQ). Then, decrementing the counter in response to transmitting cells in a packet from the input port card includes the iMS communicating with the iPQ in response to transmitting a cell. The iMS communicates after the transmission of each cell and also signals after the last cell of the packet has been transmitted.

Other aspects of the method comprise: following the routing of information packets between port cards on backplane data links through an intervening crossbar, buffering the packets in an output port card egress memory subsystem (eMS). Then, incrementing the counter in response to transmitting cells from a packet at the output port card includes: the eMS transmitting the packet on the addressed output port card egress port; the eMS communicating with an output card iPQ in response to transmitting a cell on the output; the output card iPQ communicating with the input port card iPQ via a control link; and, the input port card iPQ incrementing the counter in response to communications (receiving credits from) with the output port card iPQ.

Additional details of the above-described method and a system for cut-through packet routing in a packet communications switch fabric are provided below.

DETAILED DESCRIPTION OF THE PREFERRED EMBODIMENTS

Figure 1:
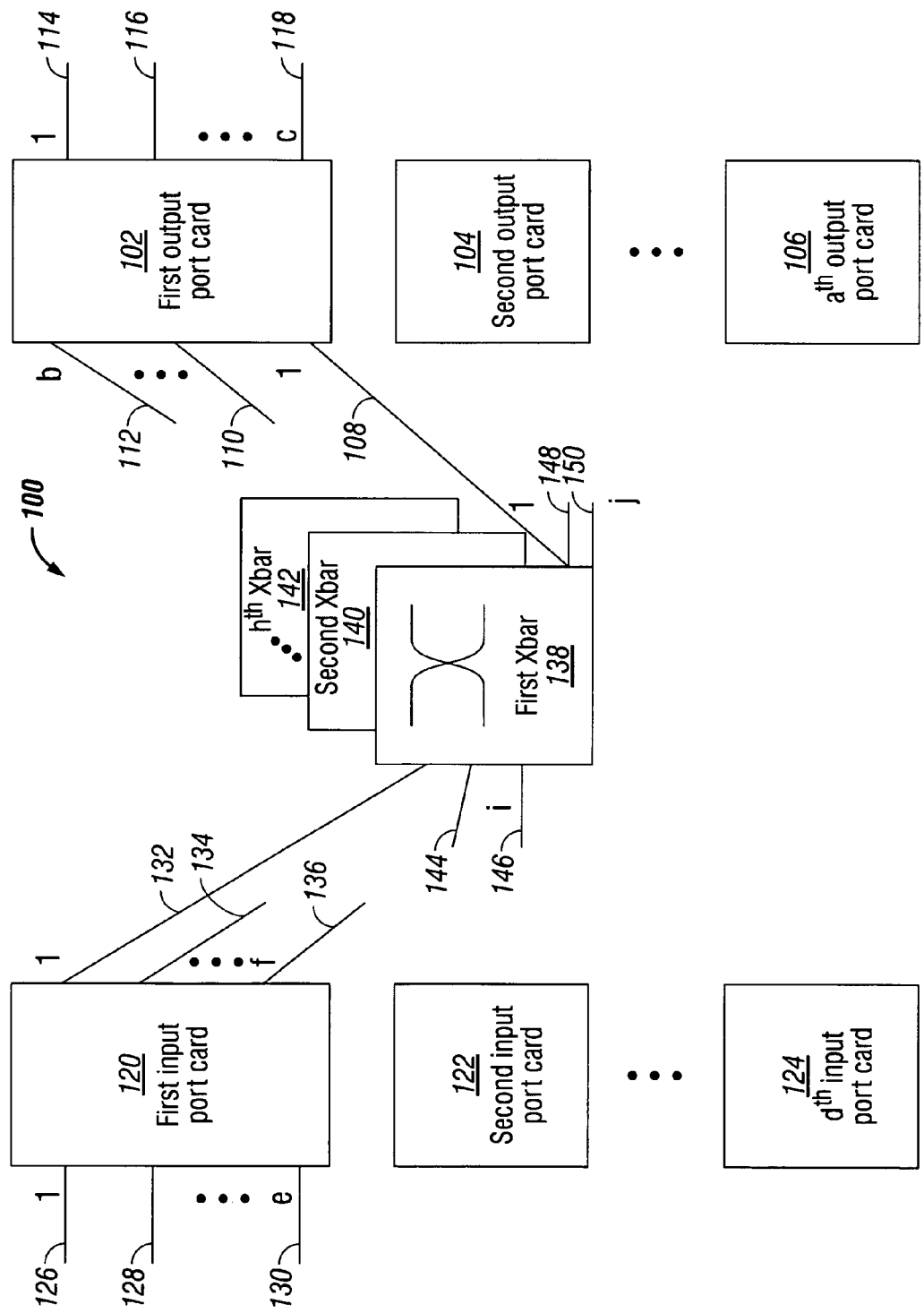
FIG. 1 is a schematic block diagram of the present invention system for cut-through packet routing in a packet communications switch fabric.

FIG. 1 is a schematic block diagram of the present invention system for cut-through packet routing in a packet communications switch fabric. The system 100 comprises an output port card including a plurality of egress ports. Shown are output port cards 1 through a (102, 104, 106, respectively), where the value of a is not limited to any particular value. Using the first output port card 102 as an example, a plurality of selectable backplane data links is shown. Backplane data links 1 through b are shown (108, 110, and 112, respectively), but the invention is not limited to any particular value of b. Egress ports 1 through c are shown (114, 116, and 118, respectively). Again, c is not limited to any particular value.

The system 100 also includes an input port card. Shown are input port cards 1 through d (120, 122, and 124, respectively), where the value of d is not limited to any particular value. Using first input port cards 120 as an example, a plurality of ingress ports 1 through e (126, 128, and 130, respectively) accept information packets that include a plurality of cells and that are addressed to the plurality of output port card egress ports. Depending upon implementation, the packets may have additional addressing information to select subchannels in a particular egress port, and/or to select a class of service (COS).

The first input port card 120 includes a plurality of selectable backplane data links. Backplane data links 1 through f (132, 134, and 136, respectively) are shown. Again, the values of e and f are not limited to any particular value.

Figure 2:
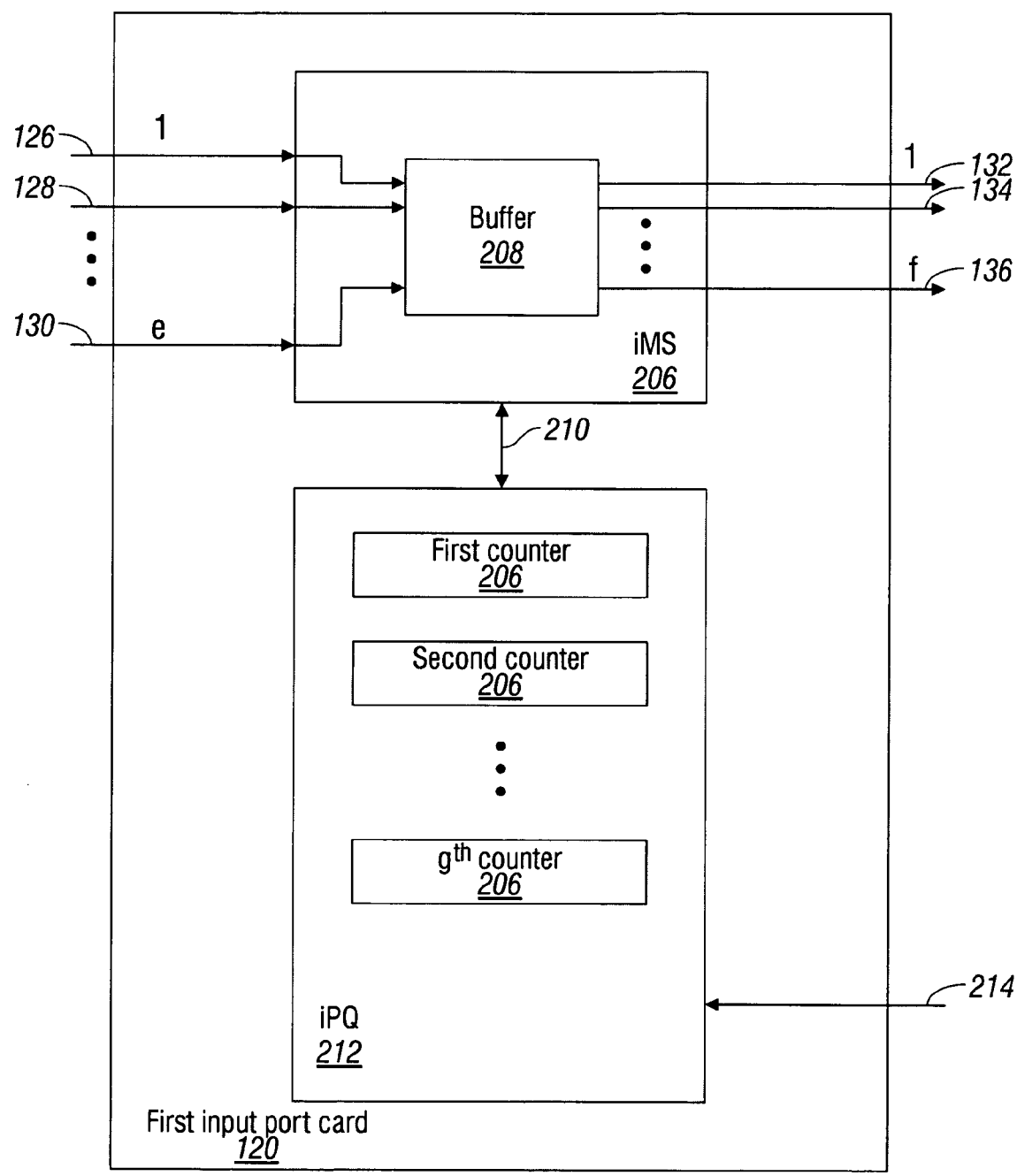
FIG. 2 is a schematic block diagram of the first input port card of FIG. 1.

FIG. 2 is a schematic block diagram of the first input port card 120 of FIG. 1. The first port card 120 includes a counter. Shown are counters 1 through g (200, 202, and 204, respectively), where g is not limited to any particular value. Using the first counter 200 as an example, the counter 200 is decremented in response to transmitting cells from a packet on the input port card backplane data links, and incremented in response to transmitting cells from the packet at the output port card egress ports. For example, the counter may be decremented in response to transmitting cells on backplane data link 132, and incremented in response to the same packet being transmitted on the first output port card egress port on line 114 (see FIG. 1).

Returning to FIG. 1, the system 100 further comprises a crossbar. Shown are crossbars 1 through h (138, 140, and 142, respectively), where the value of h is not limited to any particular value. Using the first crossbar 138 as an example, the first crossbar 138 has a plurality of inputs 1 through i (132, 144, and 146, respectively) selectively connectable to a plurality of outputs 1 through j (108, 148, and 150, respectively), where the values of i and j are not limited to any particular value. The plurality of crossbar inputs is connected to input port card backplane data links and the plurality of crossbar outputs is connected to output port card backplane data links.

Note that in some aspects of the system 100, some or all of the port cards have both ingress and egress functions. That is, a port card may be both an input port card and an output port card.

Returning to FIG. 2, the first input port card further includes an ingress memory subsystem 206 (iMS) with a buffer 208. The iMS 206 has inputs on lines 126 through 130 to accept packets received at the input port card ingress ports. The iMS 206 has outputs on lines 132 through 136 to supply selected packets to selected backplane data links in response to selection commands. The iMS 206 has a port on line 210 to receive selection commands and to supply cell transmission information.

The first input port card 120 also includes an ingress priority queue (iPQ) 212 having a port on line 210 to supply selection commands to the iMS 206 and to accept cell transmission information. The counters 200 through 204 reside with the iPQ 212. The iPQ decrements a particular counter in response cell transmission information received from the iMS 206.

The iPQ 212 includes a counter for each output port card egress port. For example, if the system includes 3 output port cards and each output port card has 3 egress ports, then 9 counters would be required. Other aspects of the system may include up to 32 output port cards, with each port card including 16 egress ports. Then, 512 (32×16) counters could be used in each input port card iPQ. Further, additional control can be added by monitoring packet transmission down to the level subchannels. If each egress port includes 4 subchannels, then 2048 (32×16×4) counters could be used in each input port card iPQ. If the packets are tracked down to the level of COS in a subchannel, then even more counters can be used ((32×16×4×(# of COS levels)).

Figure 3:
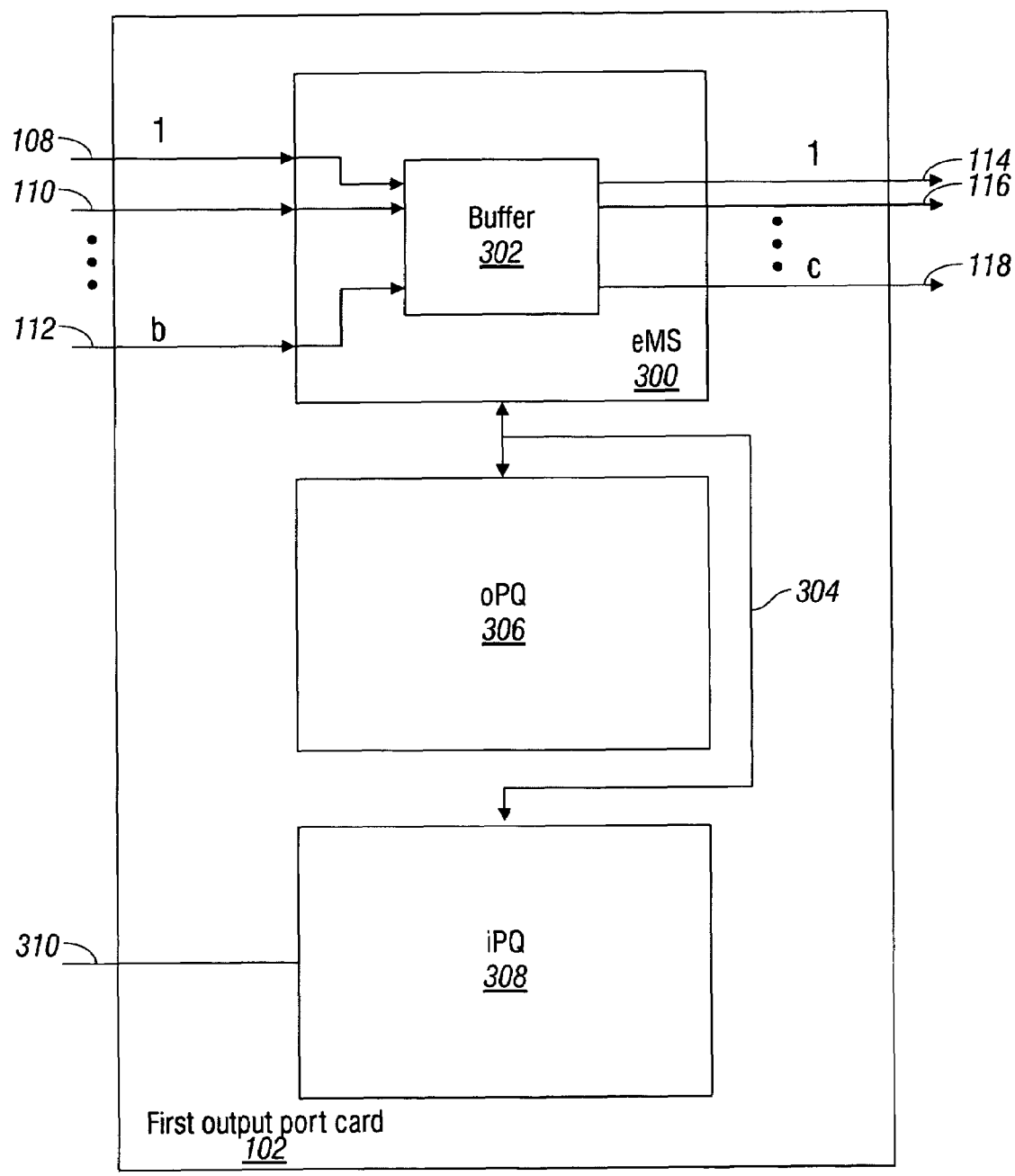
FIG. 3 is a schematic block diagram illustrating the first output port card of FIG. 1.

FIG. 3 is a schematic block diagram illustrating the first output port card 102 of FIG. 1. The first output port card 102 includes an egress memory subsystem 300 (eMS) with a buffer 302. The eMS 300 has inputs 108 through 112 to accept packets received at the output port card backplane data links. The eMS 300 has outputs to supply selected packets to selected output port card egress ports on lines 114 through 118 in response to selection commands. The eMS 300 has a port on line 304 to receive selection commands and to supply cell transmission information.

The first output port card 102 includes an egress PQ 306 (oPQ) to supply the selection commands on line 304 that direct packets, received by the eMS 300, to the proper egress port. An iPQ 308 has a port on line 304 connected to the output port card eMS port to supply selection commands to the eMS 300 and to accept cell transmission information. More specifically, the iPQ 308 negotiates with the crossbars with respect to egress backplane data links 108 through 112. Once received in the buffer 302, the oPQ 306 controls the linkage between the cells in the buffer 302 and the egress ports on lines 114 through 118. The iPQ 308 also has a port connected to a control link on line 310 to transmit the cell transmission information. Note the output port card 102 may also include an iMS (not shown) associated with iPQ 308 to support an ingress function.

Considering both FIG. 2 and FIG. 3, the input port card iPQ 212 has a port connected to a control link on line 214 to receive cell transmission information from the output port card iPQ 308. The input port card iPQ 212 increments a particular counter in response to the cell transmission information received from the output port card iPQ 212. For example, a first packet may be transmitted on backplane data links 132 and 108, through the first crossbar (see FIG. 1). As the information is transmitted from iMS 206, counter 200 is decremented. As the first packet is transmitted on egress port 114, information is communicated back to the iPQ 212, and the first counter 200 is incremented.

Figure 4:
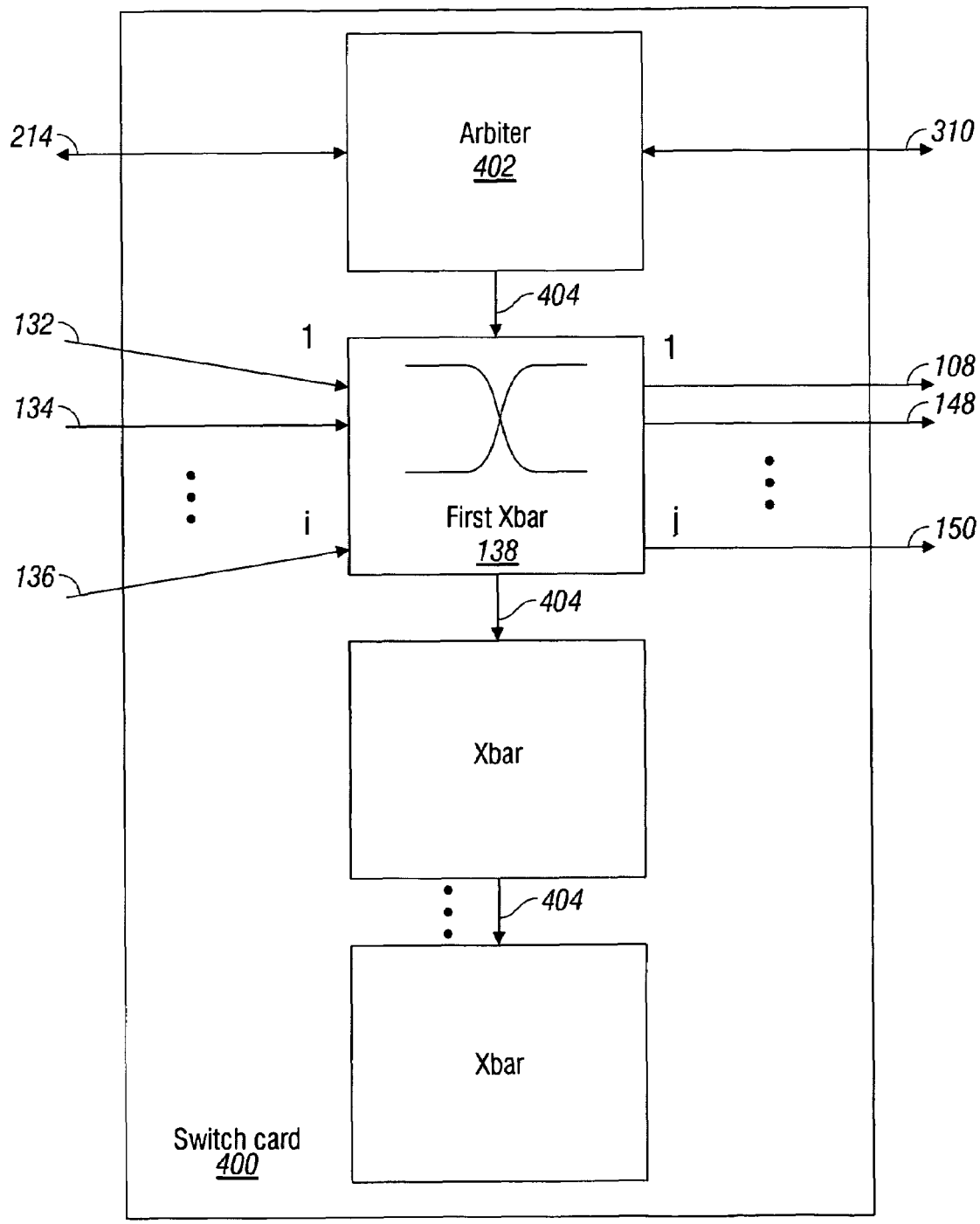
FIG. 4 is a schematic block diagram depicting the first crossbar of FIG. 1 in greater detail.

FIG. 4 is a schematic block diagram depicting the first crossbar 138 of FIG. 1 in greater detail. Shown is a switch card 400. The switch card 400 includes an arbiter 402 having a control link port connected to the input port card iPQ on line 214 and a control link port connected to the output port card iPQ on line 310. The arbiter 402 has a port on line 404 to supply crossbar selection commands. The first crossbar 138 resides with the switch card 400. The first crossbar 138 has a port on line 404 to accept selection commands from the arbiter 402.

The input port card iPQ negotiates with the arbiter 402 for backplane data link access to the crossbar 138 via the control link on line 214. Likewise, the output port card iPQ negotiates with the arbiter 402 for backplane data link access to the crossbar 138 via the control link on line 310. The output port card iPQ communicates with the input port card iPQ via control links 310/214 through the intervening arbiter 402.

It should be understood that the system may include a plurality of switch cards, and each switch card may include a plurality of crossbars controlled by a switch card arbiter. In some aspects, each port card backplane data link is routed in parallel (parallely routed) to a plurality of switch cards. Then, each arbiter has a plurality of control links (not shown) to both input and output port cards.

Considering FIGS. 2, 3, and 4, the first input port card iMS 206 stores the head cell of a packet in the buffer 208. The head cell may include a record of the packet, such as an exact count of the number of cells in the packet, or an estimated count of cells in the packet. The iMS 206 sends a record of the packet to the input port card iPQ 212. The input port card iPQ 212 begins negotiations with the arbiter 402 for backplane data link 132 access to the crossbar 138 in response to receiving the packet record. The input port card iMS buffer 208 accepts cells in a first packet on an input port card ingress port, the port on line 126 for example, and simultaneously transmits cells from the first packet on a backplane data link, backplane data link 132 for example. Note that at least one packet cell resides in the buffer 208 during transmission through the input port card 120. In some aspects, a significant number of cells in the packet may be parallely buffered before they are transmitted on the backplane data links.

The output port card eMS buffer 302 accepts cells from the first packet on a backplane data link, backplane data link 108 for example, and simultaneously transmits cells from the first packet on an output port card egress port, the port on line 114 for example. Note that at least one packet cell resides in the buffer 302 during transmission through the output port card 102. In some aspects, a significant number of cells in the packet may be parallely buffered before they are transmitted on the egress ports. In other aspects, cells from the first packet may be simultaneously accepted at an input port card ingress port, on line 126 for example, and transmitted on an output port card egress port, on line 114 for example.

In some aspects, the input port card iPQ 212 locks a backplane data link from the input port card iMS 206 to a crossbar input, to transfer the first packet. Using the above example, the iPQ 212 locks backplane data link 132. Further, the arbiter 402 locks a link between the crossbar input and a crossbar output, to transfer the first packet. Carrying the example further, the arbiter 402 locks backplane data links 132 and 108 through the first crossbar 138. Likewise, the output port card iPQ 308 locks a backplane data link from the crossbar output to the output port card eMS 300, to transfer the first packet. To finish the example, the iPQ 308 locks the backplane data link on line 108.

In some aspects, the input port card iPQ 212, following negotiations with the arbiter 402 for a particular backplane data link, selects a packet, and sends a message to the iMS. The message indicates the selected packet and the selected backplane data link. For example, the iPQ 212 may send a message to the iMS 306 concerning the first packet. The first packet may be in process of being received from an ingress port and buffered. The message from the iPQ 212 directs the iMS to transmit the first packet on the backplane data link on line 132.

In some aspects of the system, the input port card iMS 206 may receive a packet with a head cell that includes a count of the estimated number of cells in the packet. The iMS 206 transmits the estimate to the input port card iPQ 212. The input port card iPQ 212 decrements a counter associated with the selected packet by the estimate, the first counter 200 for example, and counts the number of cells actually transmitted by the input port card iMS 206. Typically, the iMS sends a signal to the iPQ after the transmission of each cell from the first packet. This signal also includes information that permits the iPQ to determine when the last cell from the first packet has been transmitted by the iMS 206. The iPQ 212 calculates the difference between the estimate and actual count, and offsets the counter 200 with the calculated difference.

Offsetting permits the counter to be "zeroed" back to its initial value. Using counters, the system is able to track the status of packets through the switch fabric. More specifically, the counters enable the cut-through function across the switch fabric. The backplane data links are locked until the packet has been transferred across the fabric. That is, the links are locked until the counters are credited back to their initial state.

FUNCTIONAL DESCRIPTION

Figure 5A:
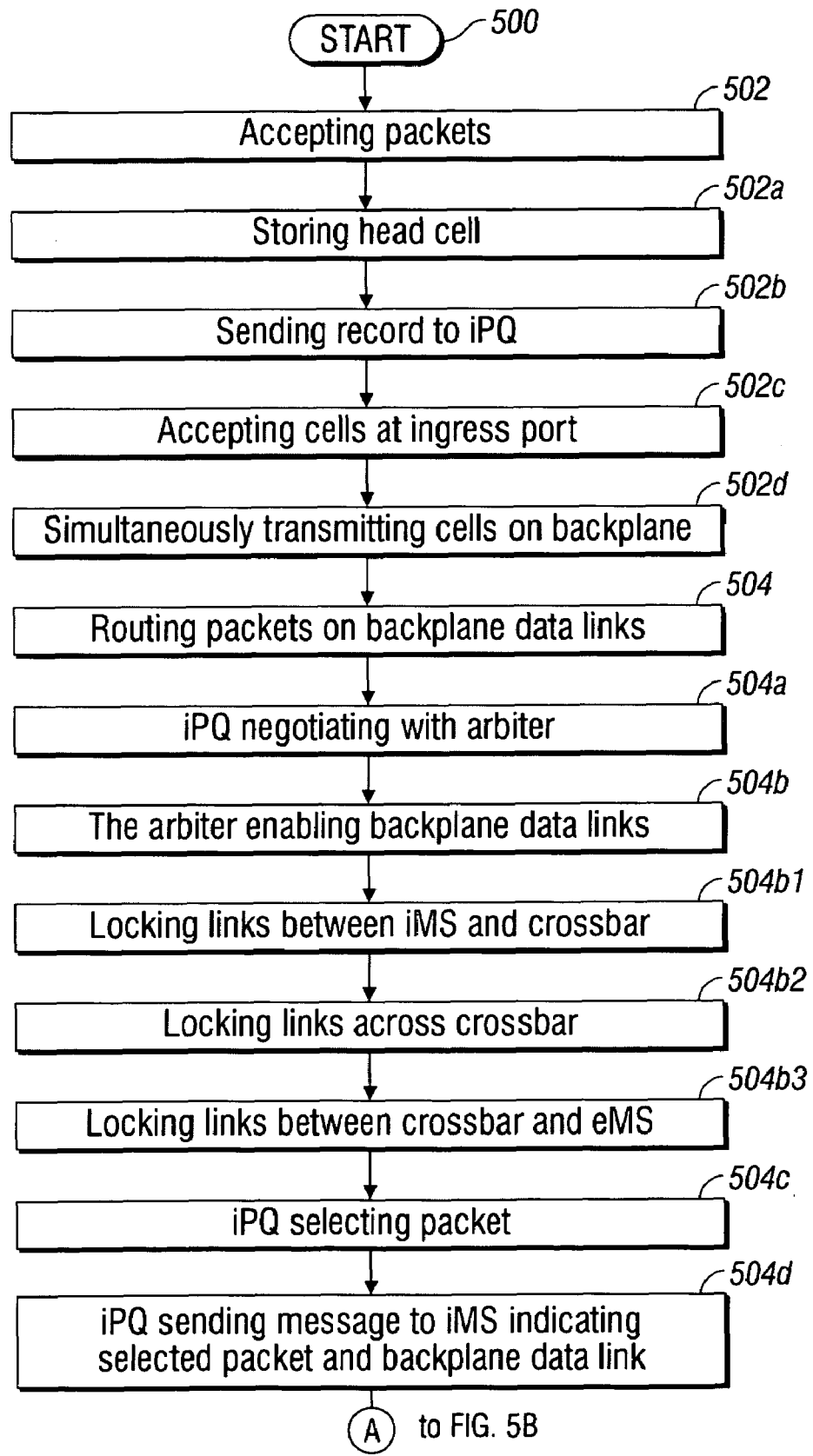
FIGS. 5*a* and 5*b* are flowcharts illustrating the present invention method for cut-through packet routing in a packet communications switch fabric.
Figure 5B:
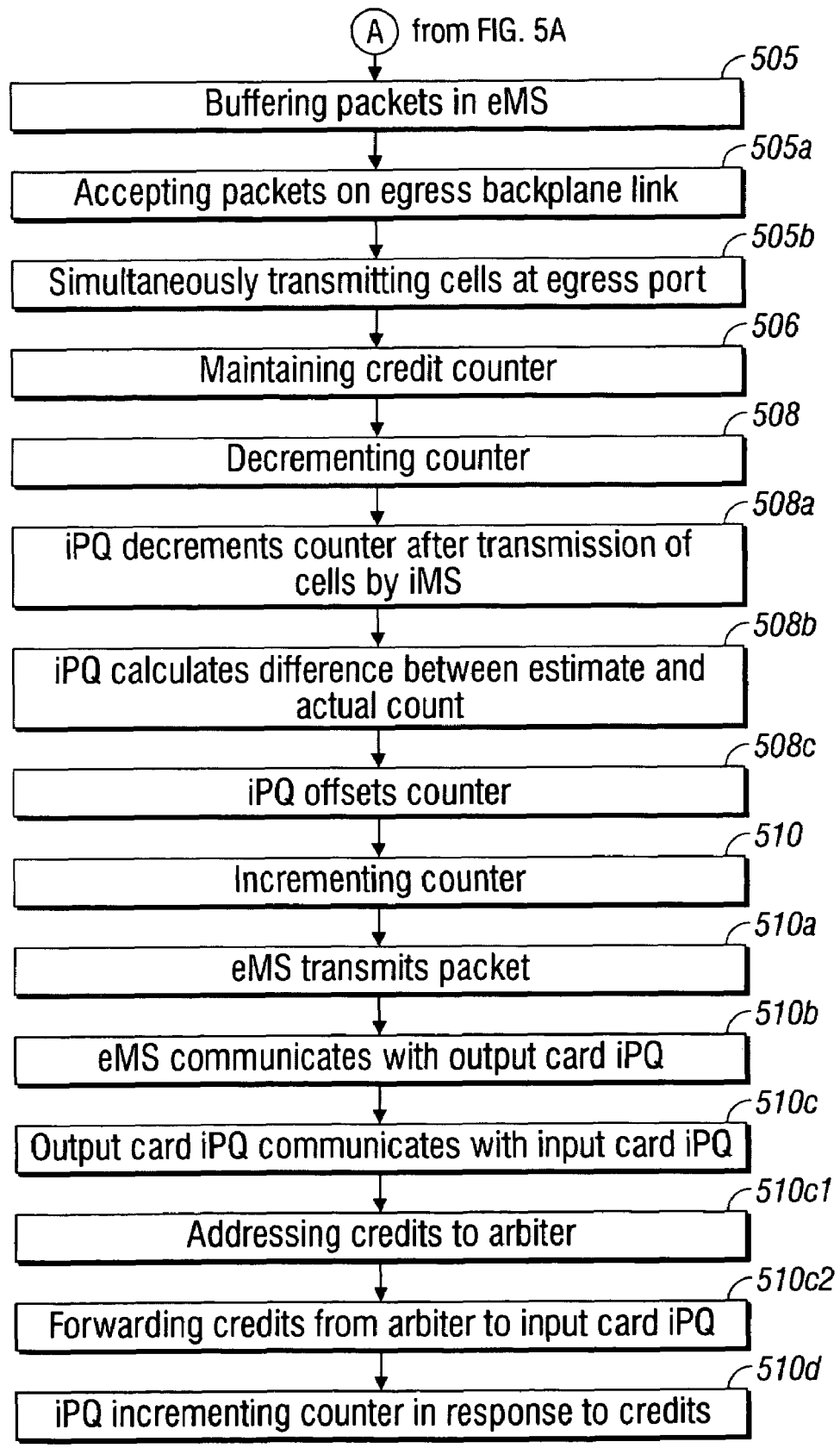
Figure 6:
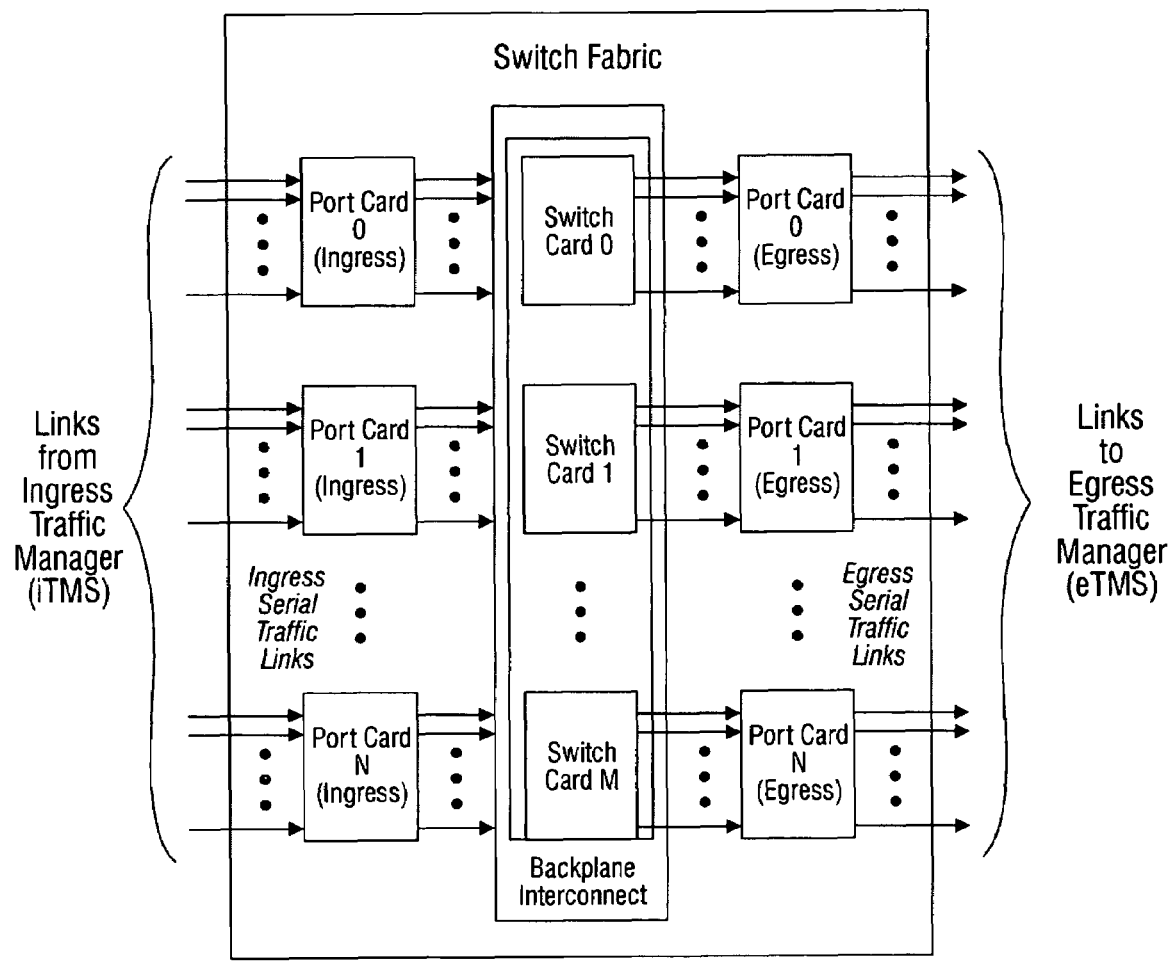
FIG. 6 is a schematic block diagram of a general switch fabric system (prior art).

FIGS. 5a and 5b are flowcharts illustrating the present invention method for cut-through packet routing in a packet communications switch fabric. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 500.

Step 502, at an input port card ingress port, accepts information packets including a plurality of cells and addressed to a plurality of output port card egress ports. Step 504 routes information packets between port cards on backplane data links through an intervening crossbar. Step 506, at the input port card, maintains a credit counter for each port card egress destination. As mentioned above, the destination or flow is programmable and can be defined as an egress port, at a finer resolution to be an egress port subchannel, or at an even finer resolution to be a COS associated with either an egress port or an egress port subchannel. Step 508 decrements the counter in response to transmitting cells in a packet from the input port card. Step 510 increments the counter in response to transmitting cells from the packet at the output port card.

In some aspects of the method, accepting information at an input port card ingress port in Step 502 includes buffering the packets in an ingress memory subsystem (iMS). Routing information packets between port cards on backplane data links through an intervening crossbar in Step 504 includes the iMS transmitting buffered packets on a selected backplane data link. Maintaining a counter for each port card egress port at the input port card in Step 506 includes maintaining the counters in an ingress priority queue (iPQ). Then, decrementing the counter in response to transmitting cells in a packet from the input port card in Step 508 includes the iMS communicating with the iPQ in response to transmitting a cell. Typically, the transmission of every cell is communicated.

Some aspects of the method include further steps. Step 505, following the routing of information packets between port cards on backplane data links through an intervening crossbar, buffers the packets in an output port card egress memory subsystem (eMS). Then, incrementing the counter in response to transmitting cells from a packet at the output port card in Step 510 includes substeps. In Step 510a the eMS transmits the packet on the addressed output port card egress port. In Step 510b the eMS communicates with an output card iPQ in response to transmitting a cell on the output. In Step 510c the output card iPQ communicates with the input port card iPQ via a control link. In Step 510d the input port card iPQ increments the counter in response to communications with the output port card iPQ. That is, the counter receives credits.

In other aspects, routing information packets between port cards on backplane data links through an intervening crossbar in Step 504 includes substeps. In Step 504a each iPQ negotiates with an arbiter via bid and grant control links for backplane data link access to a crossbar. In Step 504b the arbiter enables backplane data link connections between the crossbar and the port cards in response to the negotiation. Then, the output card iPQ communicating with the input port card iPQ via a control link (Step 510c) includes additional substeps. In Step 510c1 the output port card iPQ encodes credits addressed to the input port card iPQ into bid control link communications with an intervening arbiter. In Step 510c2 the intervening arbiter decodes and forwards the credits in grant control link communications to the addressed input port card iPQ.

In some aspects, buffering the packets in an iMS (Step 502) includes substeps. Step 502a stores the head cell of a packet in an iMS cell buffer. Step 502b sends a record of the packet to the iPQ. Then, each iPQ negotiating with an arbiter via a control link for backplane data link access to a crossbar in Step 504a includes the iPQ beginning negotiation in response to receiving the packet record.

In other aspects, buffering the packets in an iMS (Step 502) includes additional substeps. Step 502c accepts cells in a first packet on an input port card ingress port. Step 502d simultaneously transmits cells from the first packet on an ingress backplane data link.

In some aspects, buffering the packets in an output port card eMS in Step 505 includes substeps. Step 505a accepts cells from a first packet on an egress backplane data link. Step 505b simultaneously transmits cells from the first packet on an output port card egress port. In some aspects, Steps 505b and 502d are performed simultaneously.

In some aspects, the arbiter enabling backplane data link connections between the crossbar and the port cards in response to the negotiation in Step 504b includes substeps. Step 504b1 locks a backplane data link from the input port card iMS to a crossbar input, to transfer the first packet. Step 504b2 locks a link between the crossbar input and a crossbar output, to transfer the first packet. Step 504b3 locks a backplane data link from the crossbar output to the output port card eMS, to transfer the first packet.

In other aspects, the iMS transmitting buffered packets on a selected backplane data link (Step 504) includes additional substeps. In Step 504c, following negotiations with the arbiter for a particular backplane data link, the iPQ selects a packet. In Step 504d the iPQ sends a message to the iMS including (indicating) the selected packet and the selected backplane data link.

In some aspects, sending a record of the packet to the iPQ in Step 502b includes sending the estimated number of cells in the packet. Then, decrementing the counter in response to transmitting cells in a packet from the input port card in Step 508 includes substeps. In Step 508a the iPQ decrements the estimated number of cells from an associated counter in response to selecting the packet. In Step 508b, after the packet is transmitted by the iMS, the iPQ calculates the difference between number of cells decremented from the counter and the actual number of cells transmitted. In Step 508c the iPQ offsets the counter with the calculated difference.

A system and method have been provided to enable a cut-through packet routing function in a switch fabric. Some examples have been given using credit and a counter to illustrate the invention. However, the invention is not limited to merely these examples. Other variations and embodiments of the invention will occur to those skilled in the art.

We claim:

1. In a packet communications switch fabric, a method for cut-through packet routing, the method comprising:
    at an input port card ingress port, accepting information packets including a plurality of cells and addressed to a plurality of output port card egress ports;
    routing information packets between port cards on backplane data links through an intervening crossbar;
    at the input port card, maintaining a credit counter for each port card egress destination;
    decrementing the counter in response to transmitting cells in a packet from the input port card; and,
    incrementing the counter in response to transmitting cells from the packet at the output port card.

2. The method of claim 1 wherein accepting information at an input port card ingress port includes buffering the packets in an ingress memory subsystem (iMS);
    wherein routing information packets between port cards on backplane data links through an intervening crossbar includes the iMS transmitting buffered packets on a selected backplane data link;
    wherein maintaining a counter for each port card egress port at the input port card includes maintaining the counters in an ingress priority queue (iPQ); and,
    wherein decrementing the counter in response to transmitting cells in a packet from the input port card includes the iMS communicating with the iPQ in response to transmitting a cell.

3. The method of claim 2 further comprising:
    following the routing of information packets between port cards on backplane data links through an intervening crossbar, buffering the packets in an output port card egress memory subsystem (eMS);
    wherein incrementing the counter in response to transmitting cells from a packet at the output port card includes:
    the eMS transmitting the packet on the addressed output port card egress port;
    the eMS communicating with an output card iPQ in response to transmitting a cell on the output;
    the output card iPQ communicating with the input port card iPQ via a control link; and,
    the input port card iPQ incrementing the counter in response to communications with the output port card iPQ.

4. The method of claim 3 wherein routing information packets between port cards on backplane data links through an intervening crossbar includes:
    each iPQ negotiating with an arbiter via bid and grant control links for backplane data link access to a crossbar; and,
    the arbiter enabling backplane data link connections between the crossbar and the port cards in response to the negotiation; and,
    wherein the output card iPQ communicating with the input port card iPQ via a control link includes:

the output port card iPQ encoding credits addressed to the input port card iPQ into bid control link communications with an intervening arbiter; and,
the intervening arbiter decoding and forwarding the credits in grant control link communications to the addressed input port card iPQ.

5. The method of claim 4 wherein buffering the packets in an iMS includes:
storing the head cell of a packet in an iMS cell buffer; and,
sending a record of the packet to the iPQ; and,
wherein each iPQ negotiating with an arbiter via a control link for backplane data link access to a crossbar includes the iPQ beginning negotiation in response to receiving the packet record.

6. The method of claim 5 wherein buffering the packets in an ingress memory subsystem (iMS) includes:
accepting cells in a first packet on an input port card ingress port; and,
simultaneously transmitting cells from the first packet on an ingress backplane data link.

7. The method of claim 5 wherein buffering the packets in an output port card eMS includes:
accepting cells from a first packet on an egress backplane data link; and,
simultaneously transmitting cells from the first packet on an output port card egress port.

8. The method of claim 6 wherein buffering the packets in an output port card eMS includes:
accepting cells from the first packet on a backplane data link; and,
simultaneously transmitting cells from the first packet on an output port card egress port.

9. The method of claim 6 wherein the arbiter enabling backplane data link connections between the crossbar and the port cards in response to the negotiation includes:
locking a backplane data link from the input port card iMS to a crossbar input, to transfer the first packet;
locking a link between the crossbar input and a crossbar output, to transfer the first packet; and,
locking a backplane data link from the crossbar output to the output port card eMS, to transfer the first packet.

10. The method of claim 9 wherein the iMS transmitting buffered packets on a selected backplane data link includes:
following negotiations with the arbiter for a particular backplane data link, the iPQ selecting a packet;
the iPQ sending a message to the iMS including the selected packet and the selected backplane data link.

11. The method of claim 10 wherein sending a record of the packet to the iPQ includes sending the estimated number of cells in the packet;
wherein decrementing the counter in response to transmitting cells in a packet from the input port card includes:
the iPQ decrementing the estimated number of cells from an associated counter in response to selecting the packet;
after the packet is transmitted by the iMS, the iPQ calculating the difference between number of cells decremented from the counter and the actual number of cells transmitted; and,
the iPQ offsetting the counter with the calculated difference.

12. In a packet communications switch fabric, a system for cut-through packet routing, the system comprising:
an output port card including:
a plurality of egress ports; and,
a plurality of selectable backplane data links;
an input port card including:
a plurality of ingress ports accepting information packets including a plurality of cells and addressed to the plurality of output port card egress ports;
a plurality of selectable backplane data links;
a counter that is decremented in response to transmitting cells from a packet on the input port card backplane data links, and incremented in response to transmitting cells from the packet at the output port card egress ports; and,
a crossbar having a plurality of inputs selectively connectable to a plurality of outputs, the plurality of inputs connected to input port card backplane data links and the plurality of outputs connected to output port card backplane data links.

13. The system of claim 12 wherein the input port card further includes:
an ingress memory subsystem (iMS) including a buffer with inputs to accept packets received at the input port card ingress ports, outputs to supply selected packets to selected backplane data links in response to selection commands, and a port to receive selection commands and to supply cell transmission information;
an ingress priority queue (iPQ) having a port to supply selection commands to the iMS and to accept cell transmission information; and,
wherein the counter resides with the iPQ, the iPQ decrementing the counter in response cell transmission information received from the iMS.

14. The system of claim 13 wherein the iPQ includes a counter for each output port card egress port.

15. The system of claim 14 wherein the output port card includes:
an egress memory subsystem (eMS) including a buffer with inputs to accept packets received at the output port card backplane data links, outputs to supply selected packets to selected output port card egress ports in response to selection commands, and a port to receive selection commands and to supply cell transmission information;
an iPQ having a port connected to the output port card eMS port to supply selection commands to the eMS and to accept cell transmission information, and a port connected to a control link to transmit the cell transmission information; and,
wherein the input port card iPQ has a port connected to a control link to receive cells transmission information from the output port card iPQ, the input port card iPQ incrementing the counter in response to the cell transmission information received from the output port card iPQ.

16. The system of claim 15 further comprising:
a switch card including:
an arbiter having a control link port connected to the input port card iPQ, a control link port connected to the output port card iPQ, and a port to supply crossbar selection commands;
wherein the crossbar resides with the switch card, the crossbar having a port to accept selection commands from the arbiter;
wherein the input port card iPQ negotiates with the arbiter for backplane data link access to the crossbar via the control link;
wherein the output port card iPQ negotiates with the arbiter for backplane data link access to the crossbar via the control link and communicates with the input port card iPQ via control link through the intervening arbiter.

17. The system of claim 16 wherein the input port card iMS stores the head cell of a packet in the buffer and sends a record of the packet to the input port card iPQ; and, wherein the input port card iPQ begins negotiations with the arbiter for backplane data link access to a crossbar in response to receiving the packet record.

18. The system of claim 17 wherein the input port card iMS buffer accepts cells in a first packet on an input port card ingress port, and simultaneously transmits cells from the first packet on a backplane data link.

19. The system of claim 17 wherein the output port card eMS buffer accepts cells from a first packet on a backplane data link, and simultaneously transmits cells from the first packet on an output port card egress port.

20. The system of claim 18 wherein the output port card eMS buffer accepts cells from the first packet on a backplane data link, and simultaneously transmits cells from the first packet on an output port card egress port.

21. The system of claim 18 wherein the input port card iPQ locks a backplane data link from the input port card iMS to a crossbar input, to transfer the first packet;

wherein the arbiter locks a link between the crossbar input and a crossbar output, to transfer the first packet; and, wherein the output port card iPQ locks a backplane data link from the crossbar output to the output port card eMS, to transfer the first packet.

22. The system of claim 21 wherein the input port card iPQ, following negotiations with the arbiter for a particular backplane data link, selects a packet, sends a message to the iMS including the selected packet and the selected backplane data link.

23. The system of claim 22 wherein the input port card iMS receives a packet with a head cell including a count of the estimated number of cells in the packet, and transmits the estimate to the input port card iPQ; and, wherein the input port card iPQ decrements a counter associated with the selected packet by the estimate, counts the number of cells actually transmitted by the input port card IMS, calculates the difference between the estimate and actual count, and offsets the counter with the calculated difference.

* * * * *